S. W. CORBIN.
Tire Tightener.

No. 77,002. Patented April 21, 1868.

WITNESSES.
Alex T. Roberts
J. W. B. Covington

INVENTOR.
S. W. Corbin
per Munn & Co
Attorneys

United States Patent Office.

S. W. CORBIN, OF VALLONIA SPRINGS, NEW YORK, ASSIGNOR TO HIMSELF AND J. B. SANDS, OF SAME PLACE.

Letters Patent No. 77,002, dated April 21, 1868.

IMPROVEMENT IN METHOD OF TIGHTENING TIRES.

*The Schedule referred to in these Letters Patent and making part of the same.*

TO ALL WHOM IT MAY CONCERN:

Be it known that I, S. W. CORBIN, of Vallonia Springs, in the county of Broome, and State of New York, have invented a new and improved Method of Tightening Wagon-Tires; and I do hereby declare that the following is a full, clear, and exact description thereof, which will enable those skilled in the art to make and use the same, reference being had to the accompanying drawings, forming part of this specification.

This invention relates to a new and improved method of setting or tightening the tires of wagon-wheels when they have become loosened by use or from any other cause; and it consists in applying an inclined plane or wedge-device for that purpose, whereby the ends of the tire are brought together after the surplus iron (or length) has been cut therefrom, and the tire made to firmly embrace the felloe or wheel, as will be hereinafter described.

Similar letters of reference indicate corresponding parts.

Figure 1:
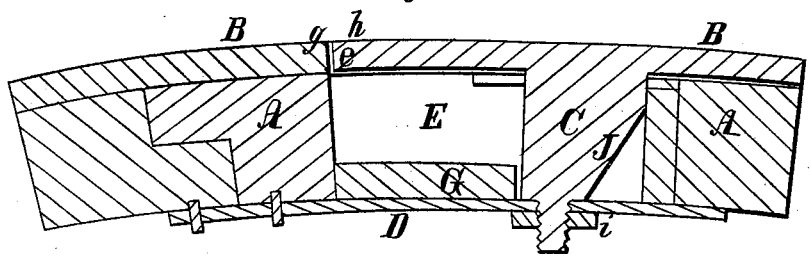
Figure 1 represents a vertical longitudinal section of a wagon-wheel where the tire is secured according to my invention.
Figure 2:
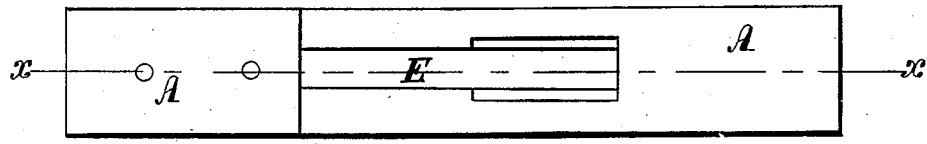
Figure 2 is a view of the top of the felloe or periphery of the wheel with the tire off.

A is the felloe; B is the tire; C is an iron block firmly welded or fastened to the tire; D is a plate or strap on the inside of the felloe, secured to the felloe at one end by bolts or screws, (but made adjustable,) and by the screw on the block C at or near the other end.

The tire is open or cut, as seen at $e$, and one of the ends is securely fastened to the felloe by bolts or in some other substantial manner. The block C is welded or fastened to the tire near the other end, as seen in the drawing.

Figure 3:
Figure 3 is a filling-block used when the tire is fastened, after the tire has been shortened.

E represents a slot or mortise in the felloe, which is rebated a portion of its length for receiving the head of the filling-block F, as seen at $o$, a side view of which block is seen in fig. 3, and an edge view of the same is seen behind the block C in fig. 1, in dotted line. G is an iron piece placed in the slot E, and which may fill or partially fill the slot, the length of which piece is governed by the length of the tire outside the block C.

When it is desired to set or tighten the tire, the thickness of the block F is cut from the end of the tire, (say at $h$,) when the block F is placed in the slot behind the block C, and the tire is brought down to its place by the screw-nut $i$. The screw on the block C is left sufficiently long to allow the inclined plane J to give the required draught as it passes through the slot.

By this method of tightening, the rim or felloe of the wheel is not injured by burning or charring, as in setting a hot tire, and much time and expense are saved.

The advantages of this device will be obvious to all who understand the importance of keeping the tire tight upon the wheel.

Having thus described my invention, I claim as new, and desire to secure by Letters Patent—

1. Tightening the tire, having one end secured in the felloes by means of the block C formed upon the opposite end of the tire, having an inclined side, J, the rebated slot E in the felloe, the T-shaped block F, block G, and plate D, all constructed, arranged, and operating as herein shown and described.

2. The slot E and blocks F and G, and plate or strap D, substantially as and for the purposes set forth.

S. W. CORBIN.

Witnesses:
NATHAN D. APPLINGTON,
S. S. DOOLITTLE.